Inventors
Ralph Kochenburger
Charles W. Chillson
George P. Knapp
By
Attorney

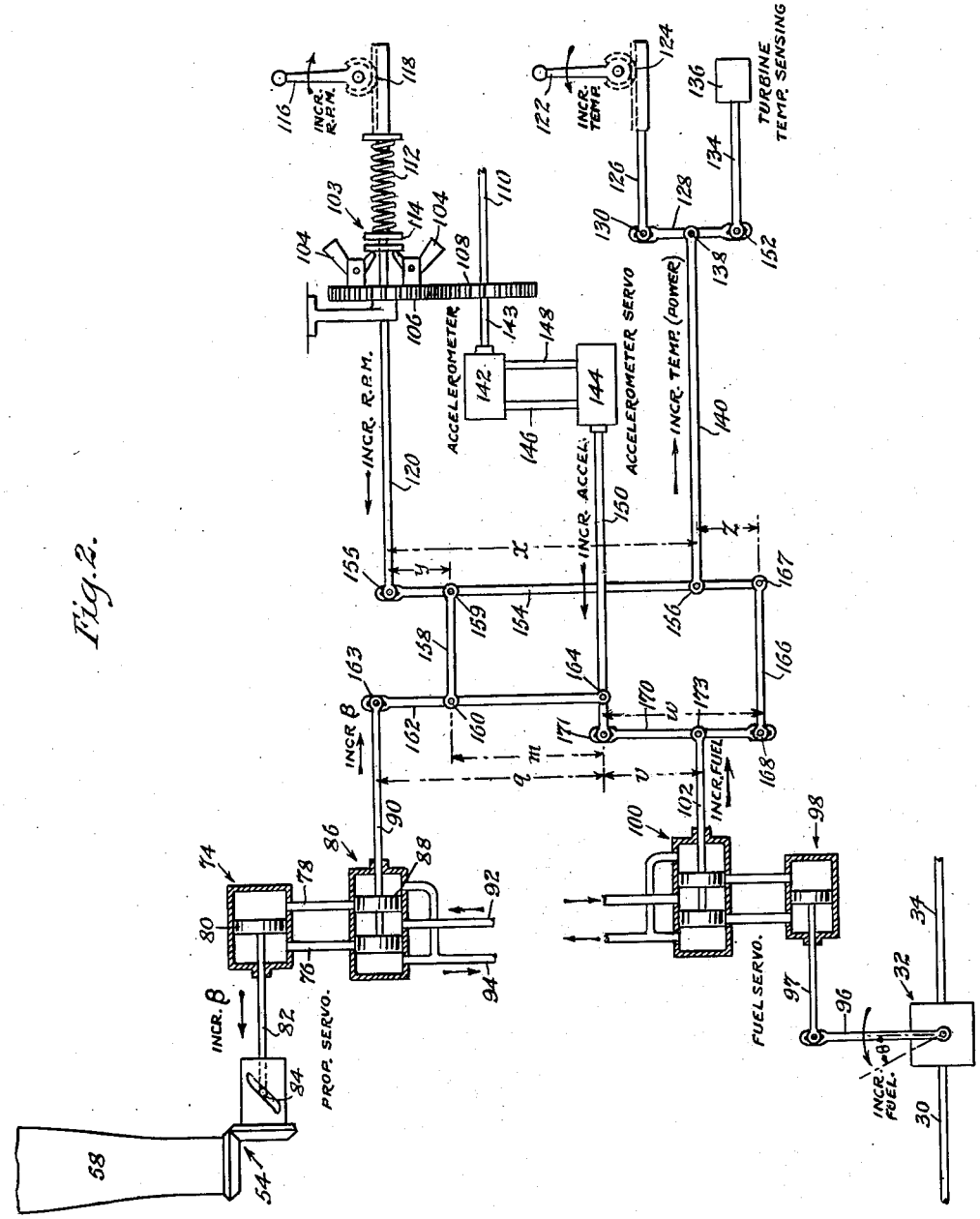

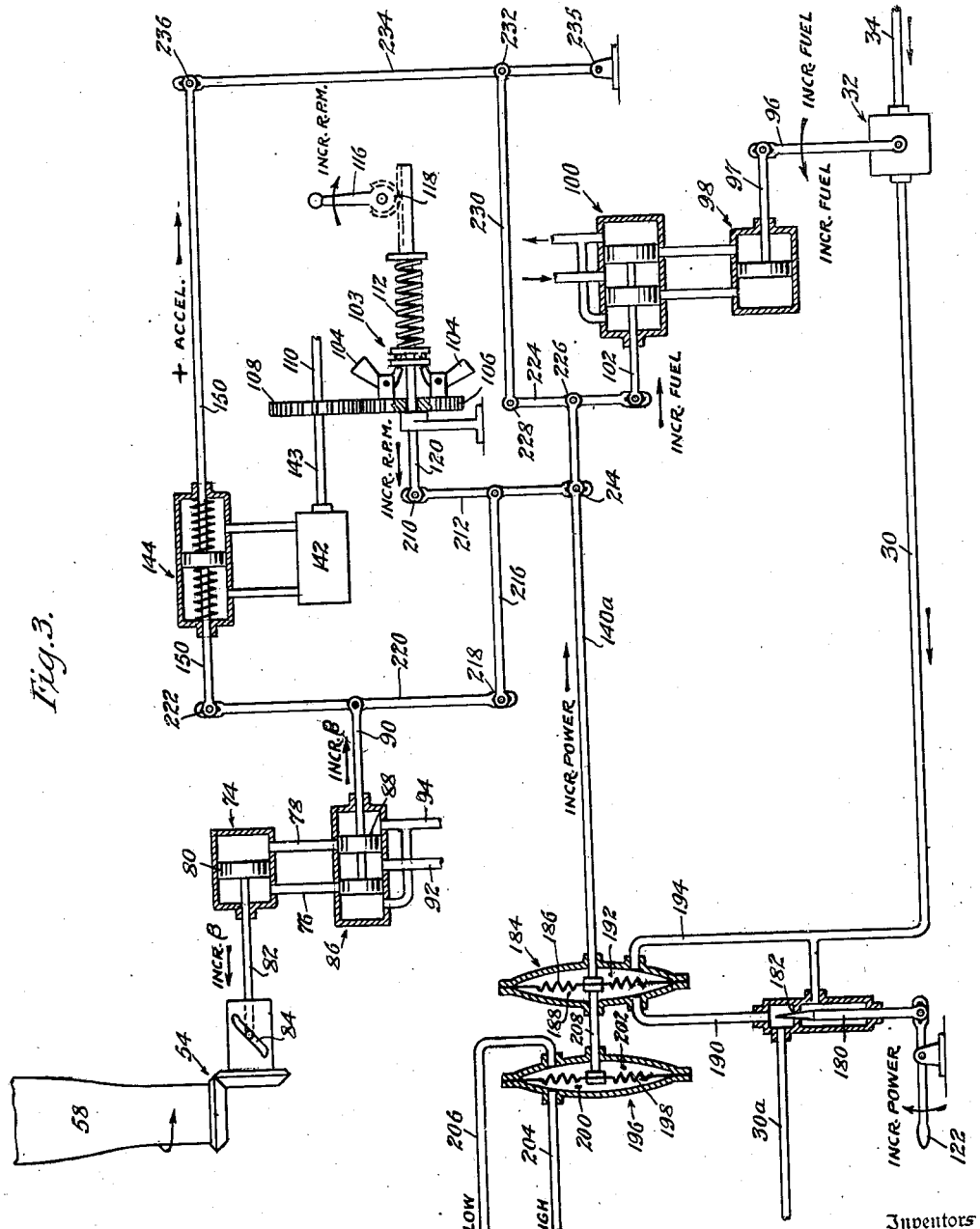

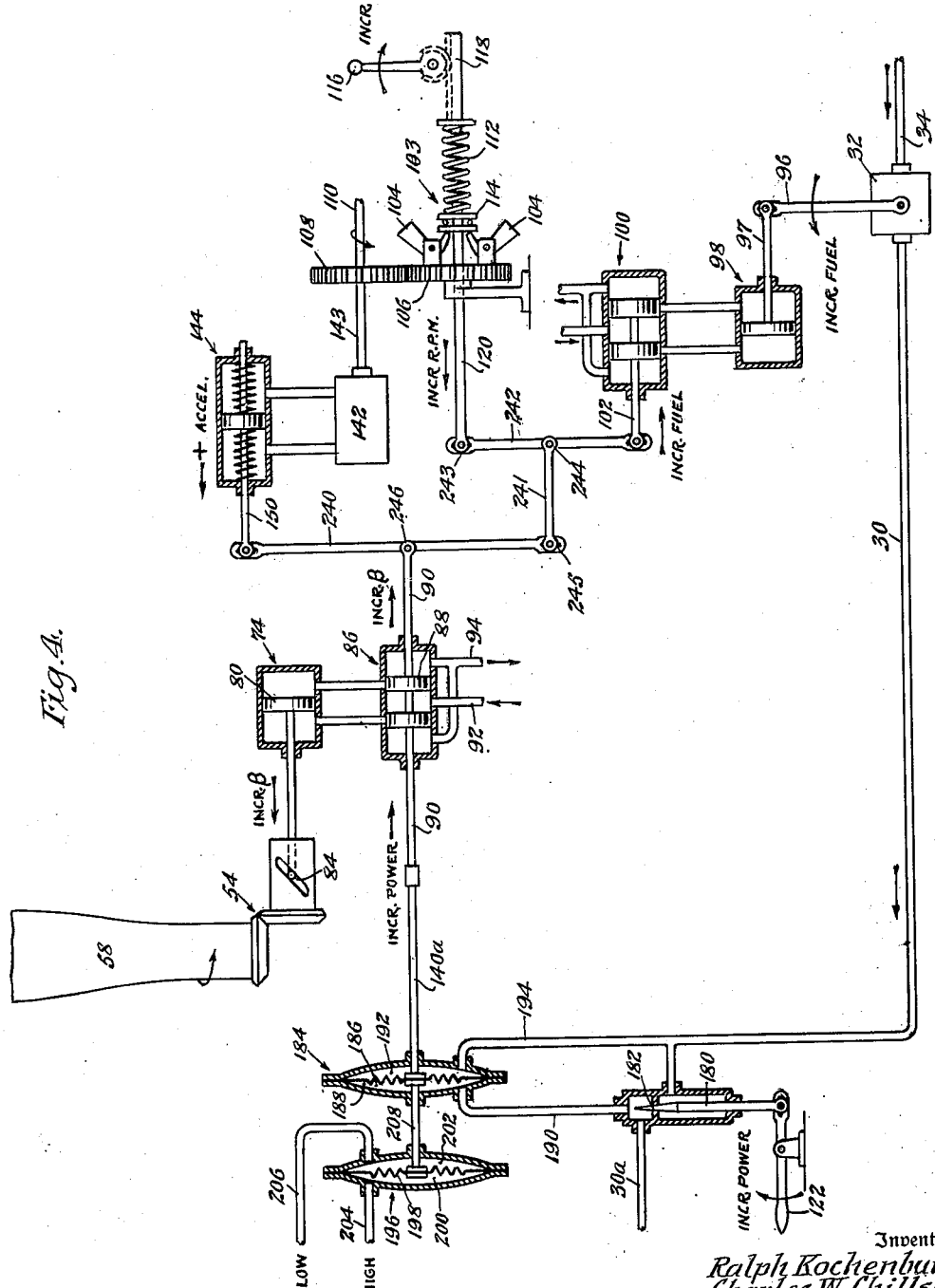

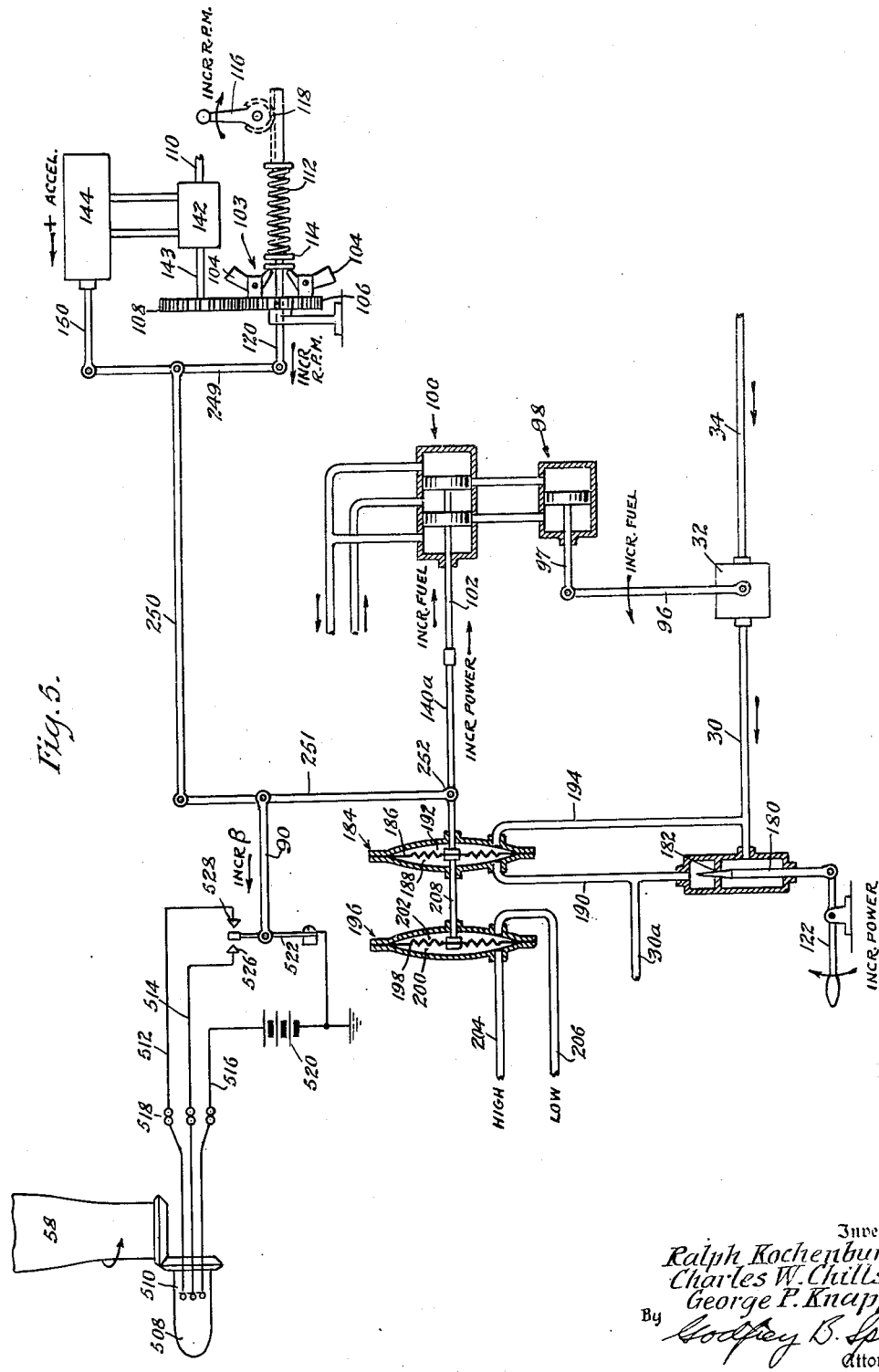

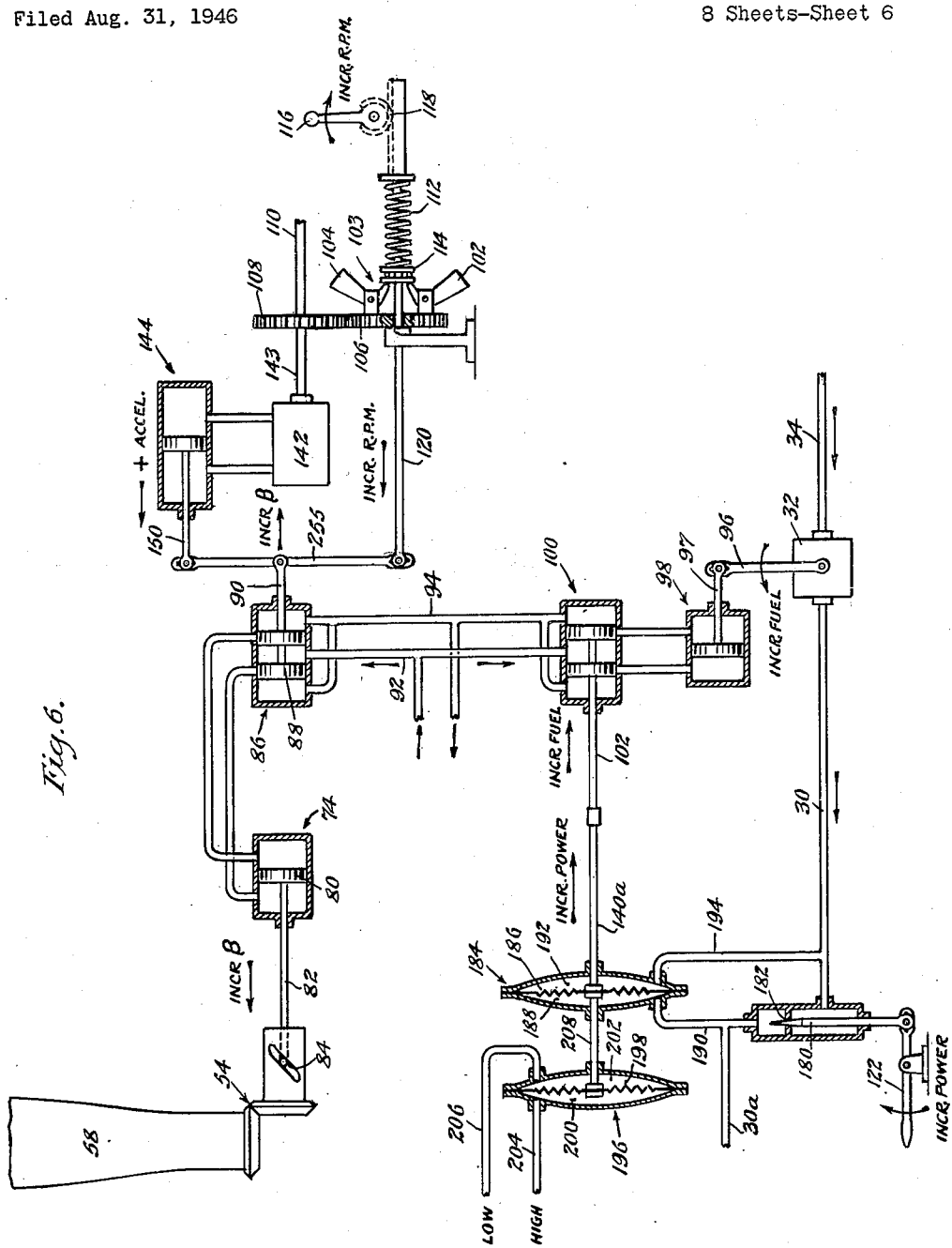

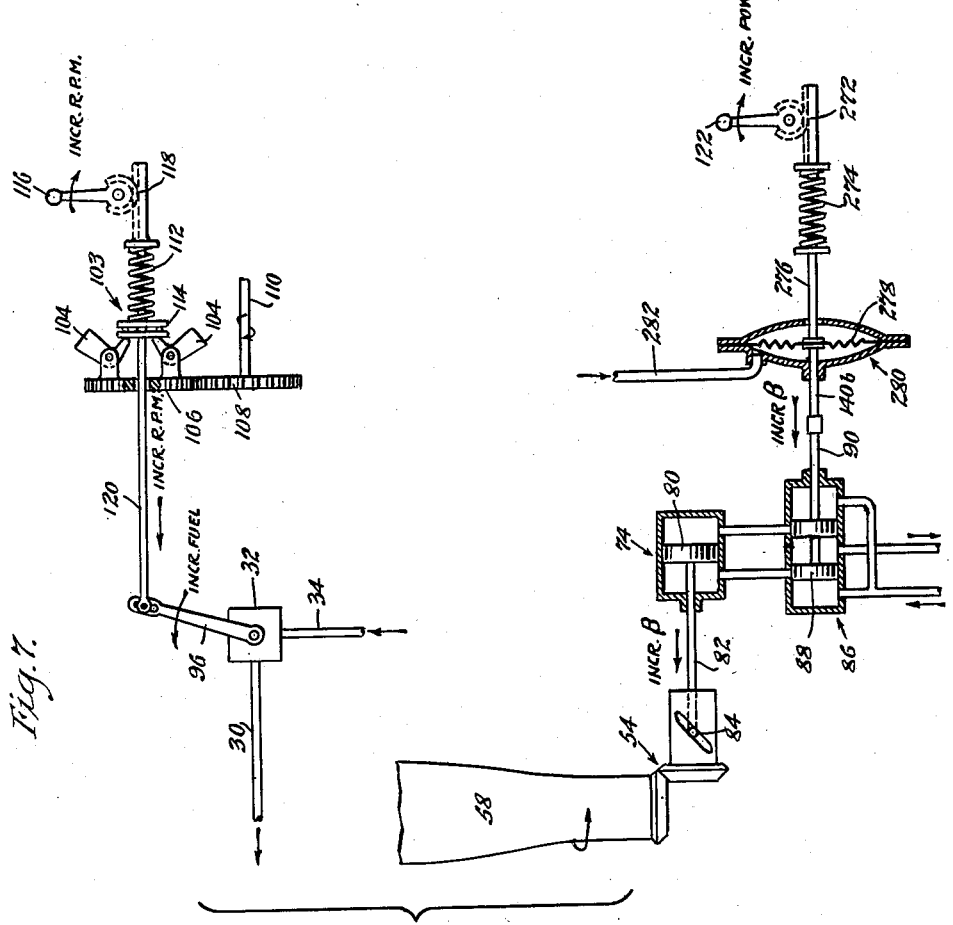

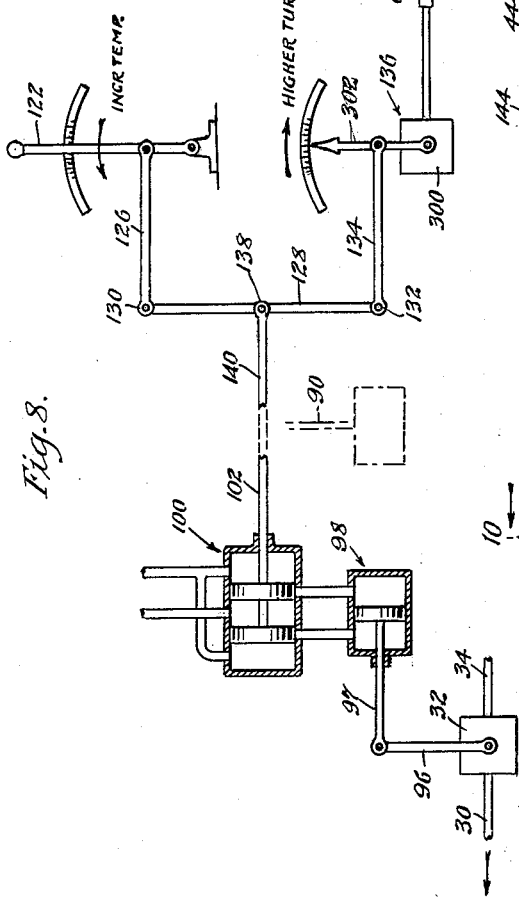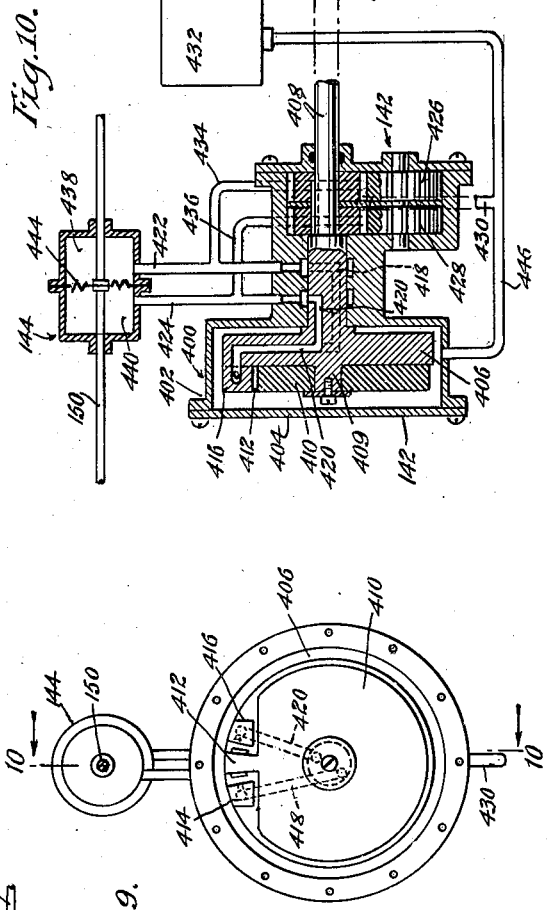

Patented Mar. 17, 1953

2,631,677

UNITED STATES PATENT OFFICE 2,631,677

TURBINE PROPELLER CONTROL

Ralph Kochenburger, West Newton, Mass., and Charles W. Chillson, Caldwell, and George P. Knapp, Verona, N. J., assignors to Curtiss-Wright Corporation, a corporation of Delaware Application August 31, 1946, Serial No. 694,398

25 Claims. (Cl. 170—135.72)

1

This invention concerns controls for internal combustion turbines, and relates particularly to coordinated control systems for such turbines, driving controllable pitch propellers, as used on aircraft.

In general, the gas turbine-propeller combination (turbo-prop) in aircraft requires precise and coordinated control of more variables than it is necessary to control in stationary turbine installations, or with conventional aircraft reciprocating engine-propeller units, or with other power plants, if the combination is to yield optimum performance. Also, protection is needed against exceeding certain limits of operation if safe use of the combination is to be attained. A primary object of the invention is to provide a proper type of control system for turbo-props, while further objects include the provision of specific mechanisms and devices which will accomplish the desired control functions when embodied in the system. Other objects will appear as the description proceeds.

The gas turbine either as a unit assembly or as an aggregation of components consists of a compressor which receives ambient air, pressure-boosted due to ram under conditions of flight, and raises its pressure to several atmospheres. Only part of the compressed air is used in the combustion chambers to combine with fuel, and the fuel-air mixture is ignited. The products of combustion mix with and raise the temperature of the balance of the air provided by the compressor, and conversely, the excess air provided by the compressor cools the combustion gases to a considerable extent. The mixed air and combustion gases are directed through a nozzle system against the blades of one or more stages of turbine wheels, which absorb a part of the energy in the hot gases, the turbine wheel temperature being controlled directly by the temperature of the mixed air and gases. The hot gases are then exhausted to the atmosphere through a jet nozzle or are otherwise disposed of. Part of the energy absorbed by the turbine may drive the compressor and the remaining energy from the turbine drives the aircraft propeller, usually through a system of reduction gearing.

In a basic gas turbine-propeller combination for aircraft, (turbo-prop) there are two parts of the system to be controlled—the pitch angle of the propeller blades hereafter called "beta" and the fuel flow to the combustion chambers. There are two basic measurements of operating status and power which can be made on the turbo-prop.

2

These are, R. P. M. of the turbine-compressor assembly or of the propeller, and some manifestation of turbine temperature produced. The manifestations of temperature may be measured by various means and all have a certain equivalency in indicating relative engine power in conjunction with the R. P. M. factor. The useable and measurable temperature and hence torque or power manifestations include alternatively and in part, the fuel flow, the fuel-air ratio involving mass air measurement, the temperature of the turbine wheel or other temperature indicative of turbine wheel temperature, torque or thrust delivered to or by the propeller, and propeller blade angle beta. Secondary measurements, i. e., derivative quantities or equivalent may be used for stabilizing effects, such measurements including in part turbine acceleration, rate of temperature (power) change, rate of torque change, rate of change of compressor discharge pressure and/or rate of change of fuel-air ratio.

In general, most efficient operation of the gas turbine along with greatest power output may occur at maximum R. P. M. and at maximum allowable fuel flow as limited by maximum turbine temperatures. Structural and metallurgical limitations establish the maximum R. P. M. and turbine temperature and the structural and metallurgical limitations therefore define the maximum power available. Under most conditions of operation, it is to be expected that R. P. M. will be held at or near the upper limit to secure best operating efficiency. Throttling of the engine to partial ratings of power will ordinarily be accomplished by regulating fuel flow to something less than the maximum allowable while maintaining preset R. P. M. which will have the effect of reducing torque and turbine temperatures below the maximum allowable. In the regulated operation of the turbo-prop in flight, changing conditions of air speed, air temperature and air density will cause substantial deviations in actual turbine power if turbine temperature remains the same. This point will be explained more fully.

Objectives in evolving an adequate control system for the turbo-prop are: (1) To provide a stable and fast responding R. P. M. control with an R. P. M. selector operable by the pilot, so organized that R. P. M. errors from any selected operating R. P. M. from idle to maximum will be corrected quickly without excessive speed transients beyond the desired value. (2) To provide a manually adjustable power control, possibly graduated in percentage of permissible power from zero to the maximum available or allowable under any operating condition; with automatic regulation, so that if the power control is set at, say, 60%, substantially 60% of the then permissible maximum power will automatically be delivered at the preset R. P. M. At a zero power setting, a finite turbine absolute temperature exists which varies with ambient conditions; however, it is well below maximum allowable temperature. The controls must also provide for correction of errors between actual power and preset power with quickness and stability, to minimize possibilities of exceeding the turbine temperature limit or other limit. (3) To provide means possibly inherent in the system to assure joint stability in the action of the speed and power controls.

If this sort of system is obtained, a pilot is always able to call for more power up to the maximum allowable, with the assurance that he will get it. Without this sort of power control, the turbine might be operating at maximum temperature at a reduced power setting, and a call for more power would yield no more.

It should be realized that maximum power available from the turbine will vary for different combinations of R. P. M., air speed, air temperature and air density although the turbine temperature and other limits may be constant. Maximum power regardless of its quantitative value will be that power, at any operating condition, where a maximum limit is first encountered, such limits including R. P. M. turbine temperature, stress in the structure or other limiting factor. There are two predominant absolute limits—maximum R. P. M. and maximum turbine temperature with which this invention is primarily concerned.

Where the propeller is capable of being operated to produce reverse thrust, limits of turbine operation for very low and reverse pitch may change in character due to other limitations, although turbine temperature remains as a basic limit. Also, other parts of the turbine may impose power limitations in forward thrust operation, other than those imposed by turbine temperature and rotational speed.

In the correct control and regulation of the turbo-prop under the various conditions encountered in operation, any purposeful or externally produced change in either R. P. M. or power (including turbine temperature) will require a coincidental change in beta and also in fuel flow to prevent the introduction of permanent or transient changes in the other quantity (power or R. P. M.). Any decrease in the mass flow of air through the turbine with respect to the fuel flow (except for air temperature changes)—that is, an increase in the fuel/air ratio, will result in turbine wheel temperature rise. Such airflow decrease or fuel/air ratio increase may result from one or more of the following changes:

a. Beta increase with consequent R. P. M. decrease.

b. Fuel flow increase.

c. Air speed decrease resulting in less ram pressure on the compressor.

An ambient air temperature increase will result in temperature increase due to lower air density and heating effect of the warmer air.

Changes above noted in the opposite sense produce the opposite effect of reducing turbine wheel temperature, and these changes may occur simultaneously and in different senses.

To secure complete and adequate control of the power plant, automatic beta adjustment and automatic fuel flow control are mandatory and must be interconnected with the R. P. M. and power controls operated by the pilot in such fashion as to secure properly proportioned interaction, when changes are made purposefully in the R. P. M. or power control, or when externally caused changes occur. They must be so interrelated that the sensitivities and stabilities of them will be compatible, and will not produce overall instability in the system, or overshoots of speed or temperature that might be harmful. In this connection, a basically stable governor when combined with a basically stable power regulator may not necessarily produce a stable system—they may, by their interaction, produce an unstable system or one whose response is excessively slow or oscillatory.

Referring to the simple diagram below, the two boxes on the left side represent the R. P. M. control operable by the pilot and the proportional power control operable by the pilot. The boxes on the right represent the mechanisms for effecting blade angle changes in the propeller, and for effecting changes in fuel flow to the turbine to be actuated by the R. P. M. and torque control. There must be at least two interconnections between the boxes on the left and those on the right to secure complete control, either within the control system itself, or indirectly through the influence of the system on the turbine.

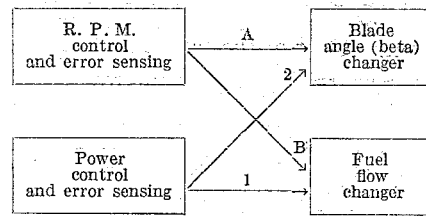

Whether or not a certain pattern of linkages will comprise an adequate control depends on analysis of each combination to determine its response characteristics; there are seven possible basic combinations as noted below. The governing and regulating devices are automatic in character, and each one considered is assumed to have substantially optimum practicable characteristics by itself. Even so, tendencies toward instability may result from a control combination unless compensations in the form of acceleration responses (as chosen for illustration) or other forms of derivative controls and other modifications are incorporated in the system. For convenience the symbols A, B, 1 and 2 are defined below and are used to indicate the functional linkages between the boxes.

Definitions

A—Beta governor responsive to R. P. M. error [1].
B—Fuel governor responsive to R. P. M. error.
1—Fuel regulator responsive to error in a power manifestation.
2—Beta regulator responsive to error in a power manifestation.
AB—Beta and fuel feed governor responsive to R. P. M. error.
12—Fuel feed and beta regulator responsive to error in a power manifestation.

[1] Error—The difference between the magnitude of the quantity called for and the magnitude existing.

B*d*—Fuel feed governor responsive to R. P. M. error, having droop characteristics wherein the governor is biased to a modified setting when changes occur.

1*q*—Fuel regulator responsive to actual torque error.

2*q*—Beta regulator responsive to actual torque error.

Satisfactory and operable combinations of these control elements and linkages are:

A1  AB1
B2  AB2
A12 AB12
B12

By incorporating derivative controls such as acceleration response in some of these combinations, improved performance may be secured; other compensations also may be included in them. For instance, the interaction sensitivity and stability of some combinations may vary in different operating regimes, and variable compensations may be incorporated to introduce corrections of the proper magnitude in each regime to secure stable and sensitive operation.

The power control may be sensed by turbine or tailpipe temperature or fuel-air ratio or other temperature manifestation. In the case of the governor, R. P. M. deviations may cause corrections in the rate of beta change (type A) or rate of fuel flow change (type B), determined by the R. P. M. error, or by the R. P. M. error as modified by suitable acceleration indications or the equivalent.

"Droop" type governors may be used in which R. P. M. deviations cause corrections in the amount of beta (type A*d*) or in the amount of fuel flow (type B*d*). Auxiliary means would be included to correct the effect that a change in power requirement will change the equilibrium R. P. M. set by the governor.

In the case where a type 2*q* torque regulator effecting rates of change in blade-angle in response to torque deviations is combined with a type B*d* "droop" type governor effecting changes in fuel flow, this combination, symbolized as B*d*-2*q*, is capable of rapid and stable response to external or purposeful disturbances, no acceleration stabilization being required. It possesses the correctible limitation for combination B-2, in that sudden changes in the setting of the R. P. M. governor can cause over-temperature conditions of short duration unless prevented by special auxiliary equipment, possibly in the form of fuel cutoff devices responsive to indications or anticipations of over-temperatures.

For a more detailed understanding of the invention and for an understanding of the specific manner in which the objectives of the invention may be accomplished, reference may be made to the attached drawings in which Fig. 1 is a longitudinal section through a typical internal combustion turbine driving a propeller;

Fig. 2 is a schematic diagram of one embodiment of a control system;

Figs. 3, 4, 5, 6 and 7 are schematic diagrams of alternative turbine control systems;

Fig. 8 is a schematic diagram of a temperature responsive control element;

Fig. 9 is a front elevation of an accelerometer with a cover plate removed; and

Fig. 10 is a section on the line 10—10 of Fig. 9.

Figure 1:
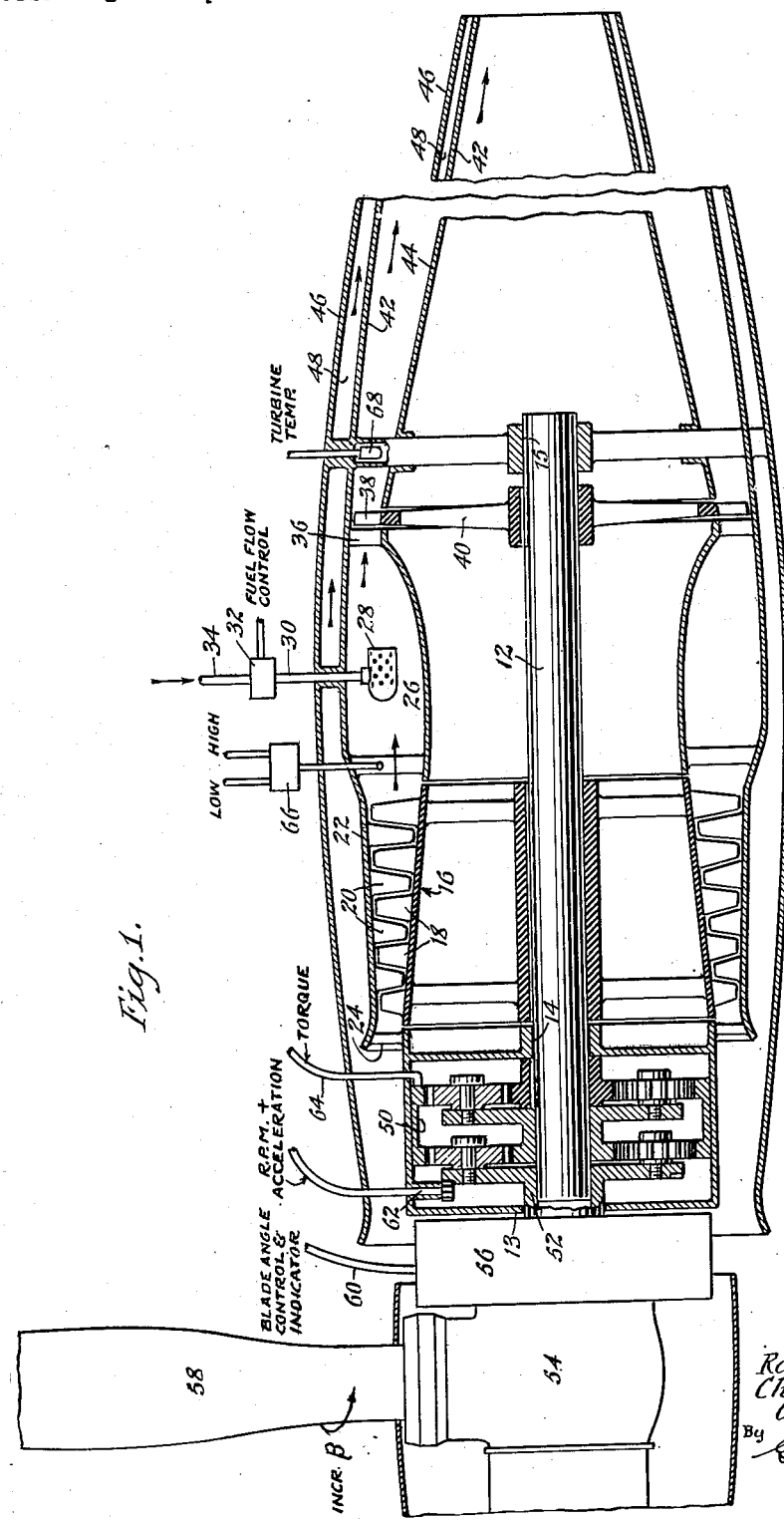

Fig. 1 will provide general orientation on the principal components of the gas turbine and on the control and response elements thereof. The axial flow turbine shown as a non-limiting example comprises a longitudinal shaft 12 carried in bearings 13, 14 and 15 forming part of the housing structure. Toward the forward end of the shaft 12, a compressor rotor 16 is secured, said rotor carrying a plurality of rows of compressor vanes 18, the rows being alternately disposed between rows of stator vanes 20, the stator vanes being carried by a cowling or housing element 22 having a forward axial air entrance opening 24. Upon rotation of the shaft 12, the compressor vanes pump air into the combustion zone 26 within which combustion chambers 28 are disposed, the latter being fed preferably with liquid fuel through one or more pipes 30, the fuel flow being regulated and controlled by a valve system 32. Fuel is supplied from appropriate tankage and pumps, not shown, through a line 34. The air for combustion of the fuel is provided from the blower, and after ignition by means not shown the products of combustion mixed with extra blown air pass through stationary nozzle vanes 36 carried by the housing 22 and impinge upon the blades 38 of a turbine wheel 40 secured to the shaft 12. More than a single turbine stage is frequently used. Gases issuing from the turbine blades 38 pass through a tailpipe 42 and around a tailcone 44 to issue to the atmosphere. Ordinarily the entire mechanism thus far described is encased in a streamlined housing or in a nacelle 46 having spaced relation to the turbine components so that some air flow may pass between the engine and the cowling as through a zone 48, for cooling the turbine, but the compressor, combustion system and turbine may be separate from one another.

At the forward end of the shaft 12, a reduction gear 50 is provided, having an output shaft 52 driving a controllable pitch propeller 54. The propeller is provided with a mechanism 56 of any appropriate type by which pitch angle of the propeller blades 58 is adjusted and by which preferably, the ptch angle of the proleller blades may be sensed or indicated. Appropriate control connections from the pitch changing system 56 are indicated at 60.

An indication or sensing of R. P. M. of the turbine system is necessary and this may be obtained from a gear connection to the reduction gear as shown at 62. An indication or sensing of torque delivered by the system is sometimes necessary and this is secured by a connection 64 leading to a torque meter of conventional form embodied in the reduction gear. An indication or sensing of air mass flow may be desired in which case a unit such as 66 may be provided with connections which lead into the compressor, its outlet, or into the combustion zone or into the air intake, so that the amount and density of the air actually used by the turbine may be measured and compared with a standard datum of density to measure air mass flow. The "high" pressure lead from the unit 66 would preferably have a pressure proportional to air mass flow, while the "low" pressure lead would be at an arbitrary or zero pressure. An indication of temperature of operation of the turbine may be necessary and while this temperature sensing may take various forms, a temperature measuring device 68 such as a thermo-couple is shown, located near one of the bearing support struts in the tailpipe.

The turbine shown is merely exemplary of turbines in general and does not form the invention per se. The invention resides in control systems which are useable with any turbine or engine system to which such systems are applicable.

When shown in subsequent figures, elements appearing in Fig. 1 will bear the same reference characters.

Referring now to Fig. 2, a control system is shown which corresponds to the fully compensated AB12 system identified in the introductory remarks. In this system, turbine load (propeller pitch) and fuel flow are controlled in response to errors between actual turbine speed and that set by the pilot's speed control lever. They are also controlled simultaneously by errors between actual power delivered (temperature) and that set by the pilot's power (temperature) control. Acceleration stabilization and compensation are applied to both turbine load and fuel flow, as being typical and exemplary of derivative stabilizing control.

In this arrangement, the propeller 54 is shown for purposes of illustration as being hydraulically operated for blade pitch change. A piston-cylinder unit 74 is fed with pressure fluid through either a pipe 76 or a pipe 78, respectively causing rightward or leftward movement of a piston 80 whose motion is transmitted to the propeller through a rod 82 and a pin and cam-slot unit 84. The feed of hydraulic fluid to the lines 76 or 78 is controlled by a servo-valve 86 containing a valve element 88 moved by a valve control rod 90. Fluid from a high pressure source, not shown, enters the valve 86 through a line 92 and may leave the valve 86 through a line 94. When the rod 90 moves leftwardly, line 92 is opened to line 76 causing rightward motion of the piston 80. Fluid is forced from the right hand end of the piston-cylinder unit 74 through the line 78 and to the outlet line 94 from the valve. Rightward movement of the rod 90 will cause leftward motion of the piston 80 and its rod 82 in the same fashion. In the arrangement shown, rightward movement of the valve rod 90 will cause an increase in blade pitch angle (beta) and vice versa. The rod 90 provides the control for propeller pitch and is moved in response to variations in turbine speed and temperature, as will be described in detail hereafter.

Fuel flow to the turbine is controlled by the valve 32 fed from the fuel source through a line 34 and in turn feeding the turbine through a line 36. A fuel valve operating handle is shown at 96 and is actuated by the piston rod 97 of a piston-cylinder motor 98 controlled by a servo-valve 100 having a valve control rod 102. The valve 100 may be fed with hydraulic fluid from the same fluid pressure source which serves the valve 86, and the valve 100 and its piston-cylinder motor 98 are similar to the valve 86 and motor 74, for purpose of illustration, and operate in the same fashion. Rightward movement of the valve control rod 102 will admit pressure fluid to the right hand side of the hydraulic motor 98 to cause leftward movement of the fuel valve arm 96 and an increase in the flow of fuel to the turbine.

A speed governor is shown at 103 and comprises conventional flyweights 104 swingably mounted on a gear 106 driven from a gear 108 which in turn is driven at a speed proportional to the speed of the turbine, by the turbine by a shaft 110. A speeder spring 112 presses upon a thrust bearing 114 tending to hold the flyweights inwardly—centrifugal force resulting from the rotation of the gear 106 will fling the flyweights 104 outwardly to balance spring force. Force on the speeder spring 112 is adjustable by a speed control handle 116 operating through a pinion and rack connection 118. Rightward movement of the speed control handle 116 will impose a force upon the speeder spring 112, which is unbalanced while a speed error exists, and the spring or flyweights will thus move a governor control rod 120 leftwardly or rightwardly respectively. When the speed setting is matched by the speed of the turbine, the force of the flyweights will balance the force of the spring 112.

The power or temperature control comprises a pilot operated handle 122 operating through a rack and pinion 124 to move a temperature control arm 126 rightwardly with a call for increased temperature and leftwardly with a call for decreased temperature. This arm 126 is pivoted to a cross link 128 at 130, the other end of the cross link being pivoted at 132 to a rod 134 connected to a turbine temperature measuring device 136 which may be in the form of a servo-motor responsive in its operation to the actual temperature of the turbine wheel or of some appropriate portion of the turbine assembly where temperature variations are proportional to those of the turbine wheel. Position of the rod 134 will be established by the actual temperature of the turbine. To an intermediate point on the cross link 128, as at 138, a temperature or power control rod 140 is pivoted. Axial movement of this rod will be caused by errors in temperature between the temperature measured by the device 136 and the setting of the temperature control lever 122.

An accelerometer to measure rotational acceleration or deceleration of the turbine is shown diagrammatically at 142, this being driven if desired through a shaft 143 from the gear 108. Measurements of acceleration or deceleration from the accelerometer 142 are transmitted to an accelerometer servo-motor 144 through lines 146 and 148. A typical accelerometer arrangement for this purpose will be described in detail in conjunction with Figs. 9 and 10. The accelerometer servo 144 is provided with an output rod 150 which may move toward the left or toward the right as shown, in response to positive or negative acceleration of the turbine, respectively. Should derivative controls other than acceleration be used in this or another system, they would not necessarily replace the accelerometer, but would be designed into the system in an appropriate manner.

The R. P. M. control rod 120, the temperature control rod 140, and the acceleration control rod 150 comprise the three controlling members which move to the right or to the left, either jointly or individually, in response to errors of R. P. M. or temperature or of acceleration indications, respectively. The elements to be controlled, either jointly or individually, are the propeller pitch control rod 90 and the fuel flow control rod 102. In order to connect these five elements together for proper interaction, the linkage in the center of the figure is provided. This linkage comprises a cross link 154 to the upper end of which, as at 155, the R. P. M. control rod 120 is pivoted. Toward, but not at, the lower end of the cross link 154, the temperature control rod 140 is pivoted as at 156. The cross link 154 may move leftwardly or rightwardly or may tilt clockwise or counterclockwise in accordance with control requirements of the rods 120 and 140. Toward the upper end of the cross link 154, a link 158 is pivoted as at 159, the other end of this link being pivoted as at 160 to an intermediate point on a cross link 162. The upper end of the cross link 162 is pivoted to the rod 90 at 163 while the lower end of the cross link 162 is pivoted to the acceleration control rod 150 as at 164. The lower end of the cross link 154 is pivoted to a link 166 as at 167, the other end of the link 166 being pivoted as at 168 to the lower end of a cross link 170, the upper end of which is pivoted as at 171 to the acceleration control rod 150. An intermediate portion of the cross link 170 is pivoted as at 173 to the fuel flow control rod 102. By proper proportioning of the distances between the pivots of the various links and rods, appropriate interaction may be secured in the system so that changes in blade angle and fuel flow will be simultaneously made in the proper amount in response to R. P. M. error, temperature error, and/or positive or negative acceleration. The linkage dimensions indicated are the same as those appearing in the following formulae and explanation which show the interaction and stability in the control system.

Qualitatively, a demand for increased R. P. M. caused by leftward movement of the rod 120 resulting from an R. P. M. error, will move the cross link 154 counter-clockwise about the point 156 as a pivot. This will move the rod 90 leftwardly calling for decreased pitch and will move the rod 102 rightwardly calling for increased fuel flow.

A call for increased temperature due to a temperature error may be made by rightward movement of the rod 140 which will move the cross link 154 counter-clockwise about the point 155 as a pivot. This will cause rightward movement of the fuel rod 102 effecting an increase in fuel flow and will also cause a lesser degree of rightward movement of the pivot 163 since the cross link 162 will move clockwise about the point 164 as a pivot. This will call for an increase in propeller pitch to an amount necessary to absorb the additional power occasioned by the increased fuel flow while maintaining R. P. M. at the preset value. Simultaneous errors in either direction sensed by movements of the rods 120 and 140 will control the propeller pitch and fuel control rods 90 and 102 in the proper direction to compensate and overcome the sensed errors.

When R. P. M. errors exist, and when correction is initiated, accelerations will be sensed by the accelerometer 142 and will be transmitted as motion to the rod 150. This rod will vary the position of the pivots 171 and 164, regulating both the pitch control and fuel control linkage in the proper amount to exert a stabilizing and compensating influence in the regulation of R. P. M. and temperature.

In a turbine propeller control system in which R. P. M. and temperature or their approximate manifestations are to be controlled some interaction of the controls can be experienced when the input (fuel) and output (propeller) are separately and independently controlled by temperature and R. P. M. error measurements. These interaction effects can be largely eliminated if, when an R. P. M. error exists or change in R. P. M. setting is made, both propeller blade angle and fuel flow are varied in a manner which will provide no change in turbine temperature, similarly when a temperature error exists or a change in temperature regulator setting is made both propeller blade angle and fuel flow may be varied in a manner which will produce no change in turbine R. P. M. When propeller blade angle and turbine temperature are so controlled the system may be designated as "fully compensated." Under these conditions the two controls (R. P. M. and temperature) act as separate systems. Depending on the control sensitivities, the response may become oscillatory when lags are present in the system, these conditions usually being noted with the higher control sensitivities desired to obtain fast response. It is quite often desirable to use sensitivities which of themselves will produce an oscillatory condition to obtain sufficiently fast response. Since the oscillatory condition is usually undesirable it is necessary to introduce some effect (stabilizing) which will either cause the oscillation to die out rapidly (highly damped but less than critically damped) or which will prevent the oscillatory condition from existing at all (over-damped or more than critically damped).

A control system of the type described above having both compensation and stabilization is schematically shown by Figure 2. The control equations for this system are given below:

$$\frac{d\theta}{dt}=k_\theta(\Delta T_R-\Delta T)+n_\theta(\Delta N_G-\Delta N)-l_\theta\frac{dN}{dt}$$

$$\frac{d\beta}{dt}=n_\beta(\Delta T_R-\Delta T)-k_\beta(\Delta N_G-\Delta N)+l_\beta\frac{dN}{dt}$$

Referring again to Fig. 2, the coefficients in these equations can be represented in terms of the linkage lengths as follows:

$$k_\theta=\frac{(x+z)v}{xw} \quad n_\theta=\frac{zv}{xw} \quad l_\theta=\frac{w-v}{w}$$

$$n_\beta=\frac{vq}{xm} \quad k_\beta=\frac{(x-v)q}{xm} \quad l_\beta=\frac{q-m}{m}$$

If the variation in turbine propeller parameters are expressed by the following relationships, which are linear approximations of actual conditions used to permit simplified mathematical treatment, the equations of R. P. M. response and temperature response can be derived. The turbine-propeller relationships are as follows:

$$\tau\frac{dN}{dt}+\Delta N=-a\Delta\beta+b\Delta W_f$$

$$\Delta W_f=f\Delta\theta+g\Delta N$$

$$\Delta T=c\Delta W_f-d\Delta N$$

The above equations are in a form which can be adjusted for different types of fuel systems by variation of the constants $f$ and $g$. (Of particular interest are (1) fuel systems where the fuel flow is determined by the fuel control lever position only ($g=0$) and (2) fuel systems in which the fuel flow is proportional to R. P. M. (one in which the fuel control lever controls the turbine driven fuel pump displacement per revolution).)

Eliminating $W_f$ from the above equations R. P. M. and temperature equations are obtained as follows:

$$\tau\frac{dN}{dt}+(1-bg)\Delta N=-a\Delta\beta+bf\Delta\theta$$

$$\Delta T=cf\Delta\theta+(cg-d)\Delta N$$

Combining these equations with the control equations the complete equations of R. P. M. and temperature become:

$$\Delta N=\frac{b/c(r_A-r_B)}{X}\tau p\Delta T_R+$$

$$\frac{(s_A-s_B)\tau p+r_As_A+r_Bs_B}{X}\Delta N_G$$

$$\Delta T=\left\{\frac{r_A}{\tau p+r_A}+\frac{[(\sigma-\delta-u_B)\tau p-s_B][(r_A-r_A)\tau p]}{(\tau p+r_A)X}\right\}\Delta T_R+$$

$$\frac{c}{b(\tau p+r_A)}\left\{s_B+\frac{[(\sigma-\delta-u_B)\tau p-s_B][(s_A+s_B)\tau p+r_As_A+r_Bs_B]}{X}\right\}\Delta N_G$$

where $$X=\tau^3p^3+(r_A+l-\sigma+u_A+u_B)\tau^2p^2+$$
$$[r_A(l-\sigma)+r_B(\delta-\sigma)-r_A(\delta-\sigma)+r_Au_A+r_Bu_B+s_A+s_B]\tau p+r_As_A+r_Bs_B$$

and $$p=\frac{d}{dt} \quad r_A=cfk_\theta\tau \quad s_A=ak_\beta\tau \quad u_A=al_\beta \quad \delta=\frac{bd}{c} \quad r_B=\frac{acn_\beta\tau}{b} \quad s_B=bfn_\theta\tau \quad u_B=bfl_\theta \quad \sigma=bg$$

Depending upon the relationship between coefficients in the above equations the speed and temperature response may be unstable, oscillatory, critically damped or overdamped and in addition interaction of speed and temperature changes may be noted.

From the equation for $\Delta N$ it can be seen that if a temperature regulator change is not to introduce an R. P. M. change $r_A$ must equal $r_B$. Therefore, $$cfk_\theta\tau=\frac{acn_\beta\tau}{b} \quad \text{or} \quad k_\theta=\frac{a}{bf}n_\beta$$

The linkage relationship shown in Fig. 2 then becomes:

$$\frac{(x+z)v}{xw}=\frac{a}{bf}\cdot\frac{vq}{xm}$$

Similarly from the equation for $\Delta T$ it can be seen that if an R. P. M. governor change is to be made without introducing a temperature change $$s_B+\frac{[(\sigma-\delta-u_\beta)\tau p-s_B][(s_A+s_B)\tau p+r_As_A+r_Bs_B]}{X}=0$$

This condition will be satisfied if $s_B=0$ and $u_B=\sigma-\delta$. The term $(s_A+s_B) p+r_As_A+r_Bs_B$ cannot be made zero if R. P. M. changes are to be permitted by changes in governor setting. To make $s_B=0$ the term $bfn_\theta\tau$ is made equal to zero which can be done by making $n_\theta=0$ or in terms of linkages shown in Fig. 2

$$\frac{zv}{xw}$$

must be zero. This can be done by making $z$ equal to zero without interfering with other linkage actions.

To make $u_B=\sigma-\delta$ the term $bfl_\theta$ is made equal to $\sigma-\delta$ or in terms of the linkages established $$\frac{w-v}{w}=\frac{\sigma-\delta}{bf}$$

Using the relationships established, i. e. $r_A=r_B$, $s_B=0$ and $u_B=\sigma-\delta$, the equations for temperature and R. P. M. become:

$$\Delta T_R=\frac{r_A}{\tau p+r_A}\Delta T_R$$

and $$\Delta N=\frac{s_A(\tau p+r_A)}{X}\Delta N_G=\frac{s_A}{Y}\Delta N_G$$

where $$Y=\tau^2p^2+(l-\delta+u_A)\tau p+s_A$$

Maintaining the relationships already established it can be seen from the above equations that $r_A$ can be selected to obtain the desired rate of response for a temperature change. Likewise $s_A$ can be selected to give the desired rate of R. P. M. response with the value of $u_A$ selected to maintain stable response. The relationship between $u_A$ and $s_A$ for critically damped R. P. M. response is:

$$l-\delta+u_A=2\sqrt{s_A}$$

or in terms of the linkage shown in Fig. 2

$$l-\delta+a\frac{(q-m)}{m}=2\sqrt{a\tau\frac{(x-y)q}{xm}}$$

Other relationships between $u_A$ and $s_A$ will result in oscillatory, unstable or over damped speed changes.

Referring to Fig. 2 it is of interest to note that for the particular example used, $z$ becomes zero resulting in no fuel flow change being made as the result of an R. P. M. error or change in governor setting. Fuel flow is changed from the accelerometer, however, through the linkage $w, v$ which it should also be noted is a compensating effect rather than stabilizing. With this effect in view, the system of Fig. 3 produces the same result as that of Fig. 2.

As has been shown above the use of an accelerometer or its equivalent serves two important functions, one, as part of a compensating system to isolate the two controls from each other and, two, as a stabilizing element to eliminate or suppress oscillatory tendencies to satisfactory levels permitting rapid response to changes.

Some variation in turbine-propeller constants can be expected with different flight conditions. Although not shown in Fig. 2, it is entirely possible and probably desirable to provide means for modifying the linkage (control system constants) as required to maintain the relationships established above for different flight conditions.

A complete list of symbols as used in the above analysis is as follows, with the exception of $s$, $u$, $r$, $\delta$ and $\sigma$ which are non-dimensional coefficients and are defined by the mathematical equations given, and $p$ which is the differential operator used in the analysis.

| Symbol | Definition | Typical Units |
|---|---|---|
| ΔN | Change in speed | R. P. M. |
| ΔT | Change in turbine temperature | Deg. Rankine. |
| ΔWt | Change in fuel flow | Lbs./hr. |
| Δθ | Change in fuel control lever position | Deg. (θ). |
| Δβ | Change in propeller blade angle | Deg. (β). |
| a | Equilibrium speed change per unit of blade angle change with fixed fuel flow. | R. P. M./degree β. |
| b | Equilibrium speed change per unit of fuel flow change with constant blade angle. | R. P. M./lb. fuel/hr. |
| c | Temperature change per unit of fuel flow change at constant speed. | Deg. (T)/lb. fuel/hr. |
| d | Temperature change per unit of speed change at constant fuel flow. | Deg. (T)/R. P. M. |
|  | Fuel flow change per unit of fuel control lever movement at constant speed. | Lbs. fuel/hr./deg. (θ). |
| g | Fuel flow change per unit of speed change at constant lever position. | Lbs. fuel/hr./R. P. M. |
| τ | Turbine-propeller time constant (time to change 63% of total change in R. P. M. which will occur after a sudden disturbance in blade angle or fuel flow). | Seconds. |

$$\left(\text{In applying the above, } \frac{dN}{dt} \text{ is equivalent to } \frac{d\Delta N}{dt}\right)$$

CONTROL SYSTEM—GENERAL

| | | |
|---|---|---|
| ΔN<sub>G</sub> | Change in governor speed setting | R. P. M. |
| ΔT<sub>R</sub> | Change in temperature regulator setting | Rankine. |
| k<sub>θ</sub> | Rate of change of fuel control lever position per unit of temperature error. | Deg. (θ)/sec./deg. (T). |
| n<sub>θ</sub> | Rate of change of fuel control lever position per unit of speed error. | Deg. (θ)/sec./R. P. M. |
| l<sub>θ</sub> | Rate of change of fuel control lever position per unit of acceleration. | Deg. (θ)/sec./R. P. M./sec. |
| n<sub>β</sub> | Rate of change of blade angle per unit of temperature error. | Deg. (β)/sec./deg. (T). |
| k<sub>β</sub> | Rate of change of blade angle per unit of speed error. | Deg. (β)/sec./R. P. M. |
| l<sub>β</sub> | Rate of change of blade angle per unit of acceleration. | Deg. (β)/sec./R. P. M./sec. |

CONTROL SYSTEM—LINKAGE

| | | |
|---|---|---|
| m, q, v, w, x, y, z | Linkage lengths | Inches. |

Referring now to Fig. 3, a control system is shown which corresponds to a modified fully compensated AB12 system, wherein a different type of power sensing arrangement is used responding to fuel-air ratio rather than to temperature and wherein the linkage is so arranged that acceleration stabilization and compensation are applied to both the propeller pitch control and to the fuel flow control, but wherein R. P. M. errors affect changes in propeller pitch but not in fuel flow. As in the Fig. 2 system, errors in power affect both propeller blade pitch and fuel flow.

Many of the components in this system are similar to those in the system of Fig. 2 and bear the same reference characters.

Control of power is afforded by the power lever 122 which actuates a needle valve 180 passing through an orifice 182 fed by the pipe 30 from the fuel regulator valve 32. The downstream side of the orifice 182 connects with a fuel pipe 30a leading to the turbine. The orifice and the needle valve serve to set up a pressure differential, the pressure drop being measured in a diaphragm cell 184 having a diaphragm 186. The diaphragm and cell define a left hand cavity 188 connected by a line 190 to the downstream side of the orifice 182. The cell and diaphragm define a right hand cavity 192 connected by a line 194 to the upstream side of the orifice 182. The pressure drop across the orifice will provide a force tending to move the diaphragm toward the left in proportion to the amount of fuel flowing through the orifice.

A second diaphragm cell 196 is provided with a diaphragm 198 dividing the cell into a left hand cavity 200 and a right hand cavity 202. The cavity 200 is connected by a line 204 to the sensing element 66 shown in Fig. 1 to provide a pressure proportional to the mass flow of air through the turbine. The cell 202 is connected to a reference pressure or vacuum, also contained if desired in the unit 66 shown in Fig. 1, the connection being by means of a pipe 206. The diaphragms of the cells 184 and 196 are connected together by a rod 208, which extends rightwardly from the cells and forms the power sensing rod 140a having the same general function as the power sensing rod 140 of Fig. 2. The forces produced within the cells 184 and 196 balance when fuel-air ratio equals that called for by the power lever 122 and jointly sense errors in fuel-air ratio from that established by the setting of the power lever by rightward or leftward movement of the rod 140a, causing the power error responsive element to vary fuel flow and/or propeller pitch. The above described fuel-air ratio sensing system is shown by way of example and is not intended to limit the kind of fuel-air sensing systems utilized in the invention. It provides one of the alternate means for power sensing along with temperature sensing, torque sensing and other variables previously indicated in the introductory remarks.

As in Fig. 2, error sensing rods 120, 140a and 150 respond respectively to R. P. M. errors, power errors, or positive or negative acceleration. Likewise, elements 90 and 102 represent respectively the control rods for propeller pitch change and fuel flow change. The linkage provided in Fig. 3 provides compensations which reach substantially the same end as the linkages of Fig. 2 but are arranged in different fashion. The R. P. M. sensitive control 120 is connected at 210 to a cross link 212 which is pivoted at its lower end to the power control rod 140a as at 214. Between the rods 120 and 140a on the cross link 212, a rod 216 is pivoted which leads to a pivot 218 on the lower end of a cross link 220, the upper end of said link 220 being pivoted at 222 to the accelerometer control rod 150. The propeller pitch control rod 90 is pivoted to the cross link 220 between its ends. It will thus be seen that if there is no power error, an increase R. P. M. demand will rock the cross link 212 counterclockwise about the point 214, moving the rod 216 leftwardly and rocking the cross link 220 clockwise about the pivot 222, thus calling for decreased beta and correspondingly greater R. P. M. Demands for control due to acceleration will be imparted from the rod 150 to the rod 90 through the link 220, the latter pivoting about the pivot 218.

The fuel flow control rod 102 is pivoted to the lower end of a cross link 224, an intermediate portion of said link having pivotal connection with the power sensing rod 140a as at 226. The upper end of the rod 224 is pivoted at 228 to a rod 230 extending rightwardly to a pivot 232 on an intermediate portion of a cross link 234. The lower end of the link 234 is pivoted as at 235 to a fixed point while its upper end is pivoted at 236 to a rightward extension of the accelerometer control rod 150.

If there are errors in power reflected by movement of the power sensing rod 140a, the cross links 212 and 224 will be rotated respectively about the pivots 210 and 228, transmitting control motion to the beta control rod 90 and to the fuel flow control rod 102. Acceleration of the turbine in either direction moves the acceleration rod 150 and will not only cause change in blade angle as previously described but will also effect changes in fuel flow through the cross link 234, the rod 230 and the cross link 224.

Referring now to Fig. 4, a control system is shown which corresponds to the B12 system previously mentioned in the introductory remarks. In this system, the speed control and governor act upon the fuel regulator, and the pilot's power control affects both propeller pitch and fuel flow. Regulator interlinkage is provided so that errors in power initiate corrections in both blade angle and fuel flow in the proper proportions while errors in R. P. M. initiate correction of fuel flow. Many of the elements shown in Fig. 4 are common to those shown in Figs. 2 and 3 and the same reference characters are applied. The interlinkage, however, is somewhat different as will now be noted. The cells 184 and 196 which, as shown, provide the means for detecting errors in fuel-air ratio or power, are connected by a rod 140a directly to the control rod 90 for propeller pitch control and are connected through links 240, 241 and 242 to the fuel valve rod 102. Thus purposeful changes or externally imposed variations in power will be applied directly to change pitch of the propeller, and through the linkage, to change fuel flow. As hereinbefore noted, the fuel-air ratio measurement is only one of several manifestations of power which can be used for sensing. The speed governor 103 is provided with the rod 120 which is movable axially in response to errors in turbine speed from the desired speed set by the speed lever 116, this rod 120 being connected at 243 to the upper end of the cross link 242. The lower portion of the link 242 as described is connected to the valve rod 102 of the fuel control regulating valve 100 which causes changes in fuel flow to correct R. P. M. errors. Another portion of the cross link 242 is connected as at 244, through the link 241, to the cross link 240 as at 245. This cross link at a point intermediate its ends is connected at 246 to a continuation of the rod 90. The servomotor 144 of the accelerometer is connected through a rod 150 to the upper end of the link 240.

Deviations in R. P. M. sensed by the governor, either due to purposeful changes of the speed control 116 or to externally imposed variations, will act to alter the fuel flow. Any acceleration or deceleration in speed will be sensed by the accelerometer and will apply corrections in the appropriate direction to the fuel flow mechanism. This system differs from the AB12 system previously described by the fact that errors in R. P. M. cause changes in fuel flow without concurrent changes in propeller pitch. Power errors demand changes in both fuel flow and blade pitch through the action of the rods 140a and 90 on the pitch and fuel flow systems. There is sufficient cross linkage in the system so that satisfactory operation may be expected.

Referring now to Fig. 5, a control system is shown which corresponds to the A12 system previously mentioned in the introductory remarks. Interlinkage is provided so that errors in power initiate corrections in both blade angle and fuel flow in the proper proportions while errors in R. P. M. initiate correction of propeller pitch. Some of the elements of Fig. 5 are common to those shown in prior figures and where appropriate, the same reference characters are applied.

In Fig. 5, an electrically controlled controllable pitch propeller is shown in lieu of the hydraulic type of the other figures. The particular type of propeller is immaterial to the control system functioning—either mechanical or electrical or hydraulic propellers may be used in any one of the embodiments of the invention. The propeller blades 58 are changed in pitch by an electric motor 508 operating on the blade gears through a speed reducer 510. Electrical conductors 512, 514 and 516, passing through a slip ring assembly 518, respectively provide decrease pitch current, increase pitch current and a common return. The return wire 516 connects with a power source 520 and thence to ground and to the terminal of a switch arm 522 operated by the arm 90 connected to the control system. The switch arm may contact either an increase pitch switch point 526 or a decrease pitch switch point 528 respectively connected to the wires 514 and 512. Closure of the switch arm 522 with one or the other of the switch points energizes the motor 508 to produce pitch increase or pitch decrease of the propeller. A rate of pitch change proportional to the off-speed error may be secured by means known in the propeller governing art.

The speed governor 103 as previously described, may be adjusted for a desired speed by the speed control lever 116. Errors in speed from the preset value result in axial movement of the governor rod 120 linked to a cross arm 249 which is in turn linked to the accelerometer servo-motor rod 150 and to a rod 250 connected to the switch operating rod 90 through a cross link 251. Thus speed errors and acceleration signals are transmitted to the propeller pitch changing mechanism to initiate pitch corrections.

Leading from the valve cylinder 100 is the fuel control rod 102 which is directly connected to the rod 140a leading to the fuel-air ratio sensing device or equivalent power sensing means, as represented by the diaphragm cells 184 and 196. Errors in power sensed by the elements 184 and 196 cause direct operation of the valve 100 with consequent operation of the fuel servomotor 98 and change in the rate of fuel flow through the fuel valve 32. Concurrently, the power sensing system initiates blade pitch corrections through the cross link 251 which is pivoted to the power sensing rod 140a at 252.

This system differs from the AB12 system previously described by the fact that errors in R. P. M. cause changes in blade angle without concurrent changes in fuel flow unless power changes demand the changes in fuel flow. Errors in power cause concurrent changes in fuel flow and propeller pitch. There is sufficient cross linkage in the system so that satisfactory operation may be expected.

Referring now to Fig. 6, a control system is shown which corresponds to the A1 system previously mentioned in the introductory remarks. In this system, a speed control and governor, and an accelerometer act upon propeller pitch and the power control and sensing device act upon fuel flow with no control system cross linkage as in other embodiments. This system is similar to the conventional engine power plant system except for accelerometer stabilization and operates satisfactorily in such systems due to the decreased importance generally attached to the inter-independence of the power and R. P. M. responses. In a turbine system an arrangement such as that in Fig. 6 may be satisfactory when acceleration stabilization is applied to the governor as shown. Propeller pitch is adjusted by the servo-motor 74 which is operated by a valve unit 86 whose rod 90 is connected to a cross link 255 connected to the accelerometer rod 150 and the governor rod 120, the governor 103 being driven in any appropriate manner as by the gear 108 and a shaft 110 driven by the power plant. Fluid for operating the servo-motor 74 is supplied and scavenged, by a pressure line 92 and a scavenge line 94, connected to the valve 86 as shown.

The diaphragm units 184 and 196 previously described as providing a means for sensing power, sense fuel-air ratio and the power lever 122 operates to create a demand for increased or decreased power as previously described. A rod 140a from the fuel-air ratio sensing device is directly connected to the movable valve rod 102 for operating the valve 100, the latter being connected as shown to the servo-motor 98 whose output rod 97 is connected to the arm 96 of the fuel valve 32 which controls the flow of fuel from the supply to the turbine. Acceleration stabilization is imposed on the speed control as previously described. With acceleration stabilization or equivalent, this system operates satisfactorily as to stability and fast response. However, to prevent severe overspeeding, sudden changes in power demand should be avoided. Also, to minimize harmful temperature rises, demands for sudden R. P. M. change should be avoided.

Referring now to Fig. 7, the control system shown corresponds to the B$d2q$ system previously mentioned in the introductory remarks. As there noted, this system is a modification of a B2 system to attain superior response speed, and stability. In this system, the speed control and governor act upon the fuel regulating valve, and the power control and torque sensing device act upon propeller pitch. There is no direct interconnection between the power control element and the speed control elements. The upper portion of Fig. 7 includes an R. P. M. control lever 116 variable to adjust the force imposed on the flyweight unit 104 by the speeder spring 112. The speed errors sensed by the governor are transmitted by the rod 120 directly to the lever 96 of the fuel valve 32 which regulates the fuel flow from the fuel line 34, from the fuel supply, to the fuel line 30 leading to the turbine power plant. The schematic representation of Fig. 7 provides a simplified direct acting "droop" governor—in practice a servo-system would be incorporated, retaining the droop characteristics. In this arrangement there will be a direct proportional relationship between the amount of fuel feed to the turbine and the difference between the actual R. P. M. and the preset R. P. M. The arrangement is such that excessive turbine speeds will cut down the flow of fuel. This type of governing is described as a "droop" type because a curve of turbine R. P. M. versus power for a fixed governor setting will show a falling off or droop of the R. P. M. curve as the fuel requirements are increased. This droop effect may be made only temporary by the addition of slow acting resetting devices for the governor, not shown.

In the lower part of Fig. 7, the power or torque lever 122, controllable by the pilot, moves a rack 272 to adjust the force of a spring 274 acting through a rod 276 on a diaphragm 278 contained within the housing 280. The left side of the housing is provided with a line 282 extending to a turbine torque meter 64 such as is indicated in Fig. 1. Torque meter fluid pressure entering the line 282 acts upon the left side of the diaphragm 278, opposing the compressive force imposed by the spring 274. The diaphragm 278 is connected by the power sensing rod 140b to the valve rod 90 controlling propeller pitch. When torque meter pressure and spring pressure balance, the valve 86 will be closed and the propeller pitch will not change. Unbalance between torque meter and spring pressure due to torque errors will cause blade pitch change, in a direction to correct the error. A greater torque output from the turbine than that called for by the setting of the control 122 will move the valve rod 90 to the right, to cause a decrease in pitch relieving the torque load on the turbine and restoring it to the preset value.

The inherent stability of the type of system shown in Fig. 7 is excellent and while the R. P. M. and torque controls are not directly interconnected, the responses of the control system to errors in R. P. M. or power will be fast, and variation of one factor will not induce oscillatory response in the combined controls, avoiding any great need for accelerometer stabilization.

All the systems described in the several figures are susceptible to considerable modification. Such modifications may include, where not already shown, a power sensing system responsive to errors in torque output of the turbine and the governor may be modified to the droop type wherein changes in fuel quantity are affected rather than changes in fuel rate, in response to R. P. M. errors. Such modifications are particularly appropriate in the B2 system, identifying it, then, as a B$d2q$ system just described. The torque, temperature or fuel-air ratio power control may be used in any of the systems, and the electric or hydraulic or any other propeller type may also be used in any of the systems.

In any of the systems previously described, provision has been made for control in the normal power range between minimum and maximum power. In actual installations of turbine-propeller units in aircraft, provisions should be made for zero power lever position along with regulation of power to zero or very low minimum value. Provision also should be made, in the case of reversible pitch propellers, for changing the mode of power control so that power will be limited by anticipated propeller stresses due to reverse thrust in addition to limitations imposed by turbine wheel temperature. Further power limitations may be required according to the structural ability of other turbine parts such as reduction gears to sustain high torque. Decrements in permissible power may be necessitated by long usage of the turbine, with consequent inability to sustain the high power level of which it was capable when new. In some installations, a tail cone may be provided to adjust the division of power between that delivered to the propeller and that delivered as pure jet. Control modifications will be desirable in such arrangements to compensate for the effects of the tail cone position or turbine temperature and R. P. M.

Fig. 8 illustrates an arrangement for sensing turbine temperature and for providing a control for the presetting of desired turbine temperature. Such a control arrangement comprises a power control as incorporated in an AB12 system such as shown in Fig. 2, or in other systems, in lieu of other sorts of power sensing and control devices. For instance, the system of Fig. 8 could be substituted for the fuel-air measuring cells 184 and 196 and the elements 124, 126 and 128 in Fig. 3 and associated elements of that system.

In Fig. 8, a thermo-couple or equivalent 68 (shown in Fig. 1) is operatively connected to a temperature indicator 300, the indicating arm 302 of which is linked to the arm 134 pivotally connected to the cross link 128 at one end thereof as at 132. The other end of the link 128 is pivotally connected to the link 126 at 130, connected in turn to the control lever 122. An intermediate portion of the cross link 128 is connected to the power control such as the rod 140 as at 138. The rod 140 affects either or both, the fuel control and the turbine load control system to secure interrelated action between the fuel flow control and load or blade pitch control. The operating handle 122 may be moved to any desired power setting which corresponds to a turbine temperature appropriate for such a setting. The link 128 is swung about the pivot 132 between the rod 134 and the link 128, altering the fuel flow and/or turbine load to cause its adjustment for a new turbine temperature setting. As the new turbine temperature setting is approached, turbine temperature will reflect in the thermo-couple 68 or its equivalent and thence into movement of the arm 302, shifting the pivot 132 until fuel flow and/or turbine load is stabilized at the new turbine temperature setting. Thereupon, no further adjustment in fuel flow and/or turbine load will occur until further changes in conditions are enforced or occur due to external influences.

In the present state of the art, thermo-couples and temperature sensing devices have considerable lag and do not produce sufficiently fast and precise indications of temperature to prevent turbine temperature overshoots, unless compensations are incorporated in the system for the delayed action. Such compensation can be incorporated. Assuming that fast responding temperature sensing devices are available, the system shown in Fig. 8 can be used in any one of the control systems herein described.

An example of an accelerometer to sense rotational acceleration and deceleration of the turbine is shown in Figs. 9 and 10. This unit, while suitable in the environment of a turbine control system, has general application in any mechanism where such an accelerometer is needed. The unit comprises a housing 400 having a bell 402 and a cover 404 at one end, the bell containing a plate 406 secured on a shaft 408 driven by a turbine or other rotating part whose accelerations and decelerations are to be sensed. On a stub shaft 409 on the plate 406, a massive disc 410 is mounted for free oscillation. Said disc carries a projection 412 near its periphery, which may move between stop posts 414 and 416 mounted on the plate 406. Said posts respectively have ports facing the projection 412 which connect with and form part of passages 418 and 420 leading through the plate 406 and the shaft 408 to ports in the shaft registering with annular grooves in the housing, said grooves respectively having connections 422 and 424.

The housing 400 contains a pair of similar oil pumps 426 and 428 whose output depends upon R. P. M. and not on back pressure, having a common suction line 430 leading to a fluid supply 432, and having separate delivery lines 434 and 436 respectively connected to the connections 422 and 424. The latter also connect respectively to closed cells 438 and 440 within the accelerometer motor 144 (referred to in previous system drawings). The cells 438 and 440 are separated by a piston or diaphragm 444, provided with centering and calibrating springs if desired. The piston is movable in response to pressure differences between the cells, the piston thus being able to move the piston rod 150 which transmits acceleration responses to any appropriate mechanism.

When the plate 406 rotates at steady speed, the disc 410 will rotate therewith and the projection 412 will center between the posts 414 and 416, providing equal bleed of fluid from the posts. Upon rotational acceleration or deceleration of the plate 406, the disc will lag or lead plate rotation, closing off one of the post ports and opening the other an amount depending on the magnitude of acceleration or deceleration, thus causing a proportional pressure difference in the lines 422 and 424, and in the cells 438 and 440.

Bleed from the ports 414 and 416 passes into the bell 402, whence it is scavenged to the pump intakes by a connection 446 from the bell to the line 430.

Though several modifications of the invention are shown, it is to be understood that the invention may be applied in various forms and in various environments. Changes may be made in the arrangements shown without departing from the spirit of the invention. Reference should be had to the appended claims for definitions of the limits of the invention.

What is claimed is:

1. An internal combustion turbine, a variable load driven thereby, variable means to feed fuel thereto, control means to preset a certain operating speed and to preset a certain manifestation of turbine temperature, means responsive respectively to deviations in turbine speed and turbine temperature manifestations from said preset values connected to and coincidentally operable to adjust said load and fuel feed means substantially simultaneously to establish turbine operation at said preset values, and stabilizing means connected to said responsive means to provide damping against oscillatory response and excessive transient speeds and temperature with substantially instantaneous response in said responsive means.

2. An internal combustion turbine, a variable load driven thereby, a variable fuel feed thereto, a sensing device for turbine speed, a sensing device for the fuel-air ratio delivered to said turbine, means to preset a desired turbine R. P. M., means to preset a desired proportion of full turbine power at the preset R. P. M., and means operable to adjust said load responsive to deviations in speed from the preset R. P. M. as noted by said speed sensing device, and also operable to adjust both said load and fuel feed responsive to deviations in fuel-air ratio as noted by said fuel-air ratio sensing device, to restore the preset power and speed.

3. An internal combustion turbine, a variable load driven thereby, a variable fuel feed thereto, a sensing device for turbine speed, a sensing device for the temperature of the turbine, means to preset a desired turbine R. P. M., means to preset a desired proportion of full turbine power at the preset R. P. M., and interacting means operable to adjust both said load and fuel feed responsive to deviations in speed from the preset R. P. M. as noted by said speed sensing device, and responsive to deviations in temperature of the turbine wheel as noted by said temperature sensing device to restore the preset power and speed.

4. In an internal combustion turbine having a variable load and a variable fuel flow, a sensing device for turbine speed, a sensing device for the temperature of the turbine combustion system, means to preset a desired turbine R. P. M., means to preset a desired proportion of full turbine power at the preset R. P. M., interacting means operable simultaneously to adjust both said load and flow, said interacting means being responsive to deviations in speed from the preset R. P. M. as noted by said speed sensing device and also responsive to deviations in temperature of the turbine combustion system as noted by said temperature sensing device to restore the preset power and speed, and means responsive to acceleration and deceleration of the turbine arranged to modify the operation of said interacting means.

5. In an internal combustion turbine having a variable load and a variable fuel flow and including respectively load and flow adjusters, a sensing device for turbine speed, a sensing device for a manifestation of turbine power output, manual means to preset a desired R. P. M., separate manual means to preset a desired proportion of full turbine power at the preset R. P. M., and interacting means connected to said sensing devices operable to adjust both said load and flow adjusters jointly responsive to deviations in speed from the preset R. P. M. as noted by said speed sensing device, and responsive to deviations in power output as noted by said power sensing device to restore the preset power and speed.

6. An internal combustion turbine, a variable pitch propeller driven thereby, a variable fuel feed thereto including respectively propeller pitch and fuel feed adjusters, a sensing device for turbine speed, a sensing device for a factor of the power absorbed by said propeller, manual means to preset a desired turbine R. P. M., separate manual means to preset a desired proportion of the factor of full turbine power at the preset R. P. M., interconnections between said propeller pitch and fuel adjusters, and means connected to said sensing devices operable to adjust said propeller and fuel feed jointly responsive to deviations in speed from the preset R. P. M. as noted by said speed sensing device, and responsive to deviations as noted by said power factor sensing device to restore the preset power factor and speed.

7. In an internal combustion turbine having a variable load and a variable fuel flow, said turbine having a compressor for ambient air, combustion chambers to which said fuel and a portion of the compressed air is delivered for burning, a turbine driven by combustion gases and substantially the balance of the compressed air, means to drive said compressor and the said variable load from the said turbine, means to preset a certain operating speed, means to preset a certain proportion of maximum power available under any operating condition of ambient air speed, density and temperature, a power sensing means, and a speed sensing means, said sensing means being interconnected and comprising mechanism to alter said load and fuel flow in response to variations in turbine speed and power from said preset values, to bring said speed and power to said preset values.

8. A turbine according to claim 7 wherein at least one of said sensing means is biased by means responsive to acceleration and deceleration of the turbine.

9. A turbine according to claim 7 including an accelerometer sensitive to turbine acceleration and deceleration, and a servo-motor actuated by said accelerometer and connected to the interconnected sensing means to impose variations in said turbine load.

10. An internal combustion turbine, a variable load driven thereby, a variable fuel feed thereto, means to preset a desired value of turbine speed, means to preset a desired level of turbine power, means to sense deviations in power from the preset level and connected to the variable load to alter turbine load to restore power to the preset level, means to sense deviations in R. P. M. from the preset level and connected to the variable fuel feed to alter fuel feed to restore R. P. M. to its preset value, means connected to the turbine to sense positive and negative turbine acceleration upon speed fluctuations thereof, and means connecting said fuel feed and said acceleration sensing means further to alter the fuel feed toward restoration of speed to the preset value.

11. An internal combustion turbine, a variable load driven thereby, a variable fuel feed thereto, means to preset a desired value of turbine speed, means to preset a desired level of turbine power, means to sense deviations in power from the preset level and connected to the variable fuel feed to alter fuel feed to restore the power to the preset level, means to sense deviations in R. P. M. from the preset level and connected to the variable load to alter turbine load to restore R. P. M to its preset value, means connected to the turbine to sense positive and negative acceleration upon speed fluctuations of the turbine, and means connecting said acceleration sensing means further to alter the variable load toward restoration of R. P. M. to its preset value.

12. An internal combustion turbine, a variable load driven thereby, a variable fuel feed thereto, means to preset a desired value of turbine speed, separate independent means to preset a desired level of turbine power, means interconnecting said variable load and variable fuel feed, means to sense deviations in speed from said preset value and jointly to alter turbine load and fuel feed through said interconnection to restore the speed to the preset value, and means to sense deviations in power from said preset level connected to alter fuel feed to restore the power to its preset value.

13. An internal combustion turbine, a variable load driven thereby, a variable fuel feed thereto, means to preset a desired value of turbine speed, separate independent means to preset a desired level of turbine power, means to sense deviations in speed from said preset value and to alter turbine load and fuel feed to restore the speed to the preset value, means to sense deviations in power from said preset level and to alter fuel feed to restore the power to its preset value, and means responsive to turbine acceleration to assist in restoring speed and power to their preset values.

14. An internal combustion turbine, a variable load driven thereby, a variable fuel feed thereto, means to preset a desired value of turbine speed, means to preset a desired level of turbine power, means to sense deviations in speed from said preset value and to alter turbine load and fuel feed to restore the speed to the preset value, means to sense deviations in power from said preset level and to alter turbine load to restore the power to its preset level, and means responsive to turbine accceleration to assist in restoring speed and power to their preset values.

15. An internal combustion turbine, a variable load driven thereby, a variable fuel feed thereto, means to preset a desired value of turbine speed, means to preset a desired level of turbine power, means to sense deviations in speed from said preset value, a connection between said speed sensing means and said variable fuel feed to alter fuel feed to restore the speed to its preset value, means to sense deviations in power from said preset level, a connection from said power sensing means to both said variable load and said variable fuel feed to alter turbine load and fuel feed to restore the power to its preset level, and means responsive to turbine acceleration connected to one of said sensing means to assist in restoring speed and power to their preset values.

16. An internal combustion turbine, a variable load driven thereby, a variable fuel feed thereto, separate independent control means to select a certain operating speed and to select a certain manifestation of turbine temperature, means to sense actual speed and to sense actual manifestations of turbine temperature, means responsive to differences between the preselected and actual speed to alter fuel feed and turbine load in such proportions as to restore the speed to the selected value without alteration of the temperature manifestation, and means responsive to differences between preselected and actual temperature manifestations to alter fuel feed and turbine load in such proportions as to restore the temperature mainfestation to the selected value without alteration of the speed.

17. An internal combustion turbine, a variable load driven thereby, a variable fuel feed thereto, a controller to set a desired speed of turbine operation, a controller to set a desired power level at which the turbine is to operate while operating at the desired speed, means connected to said fuel feed to adjust said fuel feed in response to deviations in turbine speed from the value established by said controller, acceleration responsive means to produce a stabilizing control quantity derived from speed deviations, means connecting said acceleration responsive means with said fuel feed to enable said control quantity to effect further variations in fuel feed, and means connected to adjust said load in response to deviations in power from the value established by said controller.

18. An internal combustion turbine, a variable load driven thereby, a variable fuel feed thereto, control means to set a desired level of turbine speed, control means, operable independently of the speed control means, to set any one of a plurality of desired levels of turbine temperature, means to sense actual turbine speed, means to sense actual turbine temperature; and means actuated by difference between set speed and actual speed, and between set temperature and actual temperature, to adjust said variable load and variable fuel feed concurrently and in proper proportion to bring the set and actual speeds into coincidence and to bring the set and actual temperatures into coincidence.

19. An internal combustion turbine, a variable load driven thereby, a variable fuel feed thereto, control means to set a desired level of turbine speed, control means operable independently of the speed control means to set any one of a plurality of desired levels of turbine temperature, the power output of said turbine being variable due to differences in operating conditions even when operating at the set levels of speed and temperature, an actual speed sensing device, a sensing device to sense a manifestation of actual turbine temperature, and means controlled by said sensing devices to adjust said variable load and variable fuel feed to produce turbine operation at the set levels of turbine speed and temperature.

20. An internal combustion turbine, a variable load driven thereby, a variable fuel feed thereto, mean to sense the actual turbine speed, means to sense a manifestation of actual turbine temperature; control means to preset any one of several different desired speed levels, separate independently operable control means to preset any one of several different desired operating temperature levels, and means controlled by both said sensing means, responsive to deviations thereof from respective speed and temperature control means settings, to vary said load and to vary said fuel flow in amount to cause turbine speed and temperature to reach the levels preset by respective speed and temperature control means.

21. An internal combustion turbine, a variable load driven thereby, a variable fuel feed thereto, means to sense actual turbine speed, means to sense a function of actual turbine power at a preset speed, control means to preset any one of several different desired speed levels in the normal range, separate independently operable control means to preset any one of several different desired normal operating levels of a function of turbine power, connections between said speed sensing means and said variable load and said variable fuel feed, and connections between said power sensing means and said variable load and said variable fuel feed, to vary said load and to vary said fuel flow in amount to cause turbine speed and turbine power function to reach the levels preset by respective speed and power function control means.

22. An internal combustion turbine having in combination a variable load driven thereby, a variable fuel feed for the turbine, an adjustable speed controller to select a desired operating speed, a separate adjustable power controller to select a desired operating power for any selected speed, means solely for varying said fuel feed connected to and operated by said speed controller, and means for varying both said variable load and said fuel feed connected to and operated by said power controller.

23. An internal combustion turbine, a variable load driven thereby, a variable fuel feed thereto, means to set a desired speed of operation, said speed setting means being connected to said variable load for major adjustment thereof, and being connected to said variable fuel feed for minor adjustment thereof, said turbine having a maximum temperature operating limit which may be reached by varying power outputs under varying operating conditions, and means to select the power of said turbine to a value which is a selected fraction of the maximum power as limited by said high temperature operating limit, said power selecting means being connected to said variable fuel feed for major adjustment thereof and being connected to said variable load for minor adjustment thereof, said adjustments in load and fuel feed being concurrent and of amount such as to substantially maintain turbine speed at the selected level and to bring power to the selected fraction of maximum power.

24. An internal combustion turbine, a variable load driven thereby, a variable fuel feed thereto, means to preset a desired value of turbine speed, separate independent means to preset a desired level of turbine power for a preset speed, means to sense deviations in speed from the preset value, means interconnecting said speed sensing means with said variable load and said variable fuel feed jointly to alter load and fuel feed in response to speed deviations, means to sense deviations in power from the preset value, and an interconnection between said power sensing means and said variable load to alter only turbine load in response to power deviations.

25. An internal combustion turbine, a variable load driven thereby, a variable fuel feed thereto, means to preset a desired value of turbine speed, separate independent means to preset a desired level of turbine power for a preset speed, means to sense deviations in speed from the preset value, means interconnecting said speed sensing means and said fuel feed to alter fuel feed only to restore speed to its preset value upon speed deviations therefrom, means to sense deviations in power from the preset value, and means interconnecting said power sensing means jointly to alter said variable load and said variable fuel feed to restore the power to its preset level upon power deviations therefrom.

RALPH KOCHENBURGER.
CHARLES W. CHILLSON.
GEORGE P. KNAPP.

REFERENCES CITED

The following references are of record in the file of this patent:

UNITED STATES PATENTS

| Number | Name | Date |
|---|---|---|
| 2,303,998 | Holley | Dec. 1, 1942 |
| 2,306,953 | Jung | Dec. 29, 1942 |
| 2,322,303 | Martin | June 22, 1943 |
| 2,336,052 | Andersen | Dec. 7, 1943 |
| 2,336,232 | Doran | Dec. 7, 1943 |
| 2,371,889 | Hermitte | Mar. 20, 1945 |
| 2,372,686 | Sedille | Apr. 3, 1945 |
| 2,432,177 | Sedille | Dec. 7, 1947 |
| 2,457,595 | Orr | Dec. 28, 1948 |
| 2,517,150 | Webb | Aug. 1, 1950 |